US006082743A

United States Patent [19]

Black

[11] Patent Number: 6,082,743

[45] Date of Patent: Jul. 4, 2000

[54] METHOD OF LEVELING A RECREATIONAL VEHICLE

[75] Inventor: Delbert Loyd Black, Wellington, Colo.

[73] Assignee: TP-Jac, Inc., Fort Collins, Colo.

[21] Appl. No.: 09/128,385

[22] Filed: Aug. 3, 1998

Related U.S. Application Data

[63] Continuation of application No. 08/761,969, Dec. 10, 1996
[60] Provisional application No. 60/008,456, Dec. 11, 1995.

[51] Int. Cl.$^{7}$ ........ B60S 9/00
[52] U.S. Cl. ........ 280/6.153; 248/188.2; 254/93 HP
[58] Field of Search ........ 280/6.153; 248/188.2, 248/188.3, 352; 254/93 R, 93 HP, 93 H

[56] References Cited

U.S. PATENT DOCUMENTS

| | | | |
|---|---|---|---|
| D. 334,862 | 4/1993 | Harris | D6/604 |
| D. 347,502 | 5/1994 | Mazza | D34/32 |
| D. 347,503 | 5/1994 | Wallace et al. | D34/32 |
| 1,060,496 | 4/1913 | Rouchleau | 280/93 R |
| 1,493,729 | 5/1924 | Brown . | |
| 2,140,325 | 12/1938 | Morse | 121/46 |
| 2,328,970 | 9/1943 | Farquhar | 280/93 H |
| 2,495,092 | 1/1950 | Cox et al. | 254/93 |
| 2,609,177 | 9/1952 | Hughes | 254/94 |
| 2,714,011 | 7/1955 | Albee | 280/1 |
| 3,026,541 | 3/1962 | Murat | 5/81 |
| 3,086,753 | 4/1963 | Cushman | 254/93 |
| 3,523,679 | 8/1970 | Clay | 254/93 |
| 3,565,398 | 2/1971 | Floria et al. | 254/93 |
| 3,670,849 | 6/1972 | Milner, Jr. . | |
| 3,687,480 | 8/1972 | Fader et al. . | |
| 3,695,582 | 10/1972 | Clay | 254/93 |
| 3,752,331 | 8/1973 | Colburn . | |
| 3,757,699 | 9/1973 | Wirth . | |
| 3,787,897 | 1/1974 | Sabin et al. | 2/158 |
| 3,787,953 | 1/1974 | Smoot | 29/427 |
| 3,836,161 | 9/1974 | Buhl | 280/6.153 |
| 3,917,307 | 11/1975 | Shoebridge | 280/6.153 X |
| 3,933,359 | 1/1976 | Wallace | 280/6.153 |
| 3,982,731 | 9/1976 | Tezuka | 254/93 |
| 3,990,681 | 11/1976 | McKeen, Sr. | 254/88 |
| 4,060,170 | 11/1977 | Walters | 214/331 |
| 4,060,173 | 11/1977 | Dahl | 220/4 |
| 4,061,310 | 12/1977 | Vetter | 254/93 |
| 4,143,854 | 3/1979 | Vetter | 254/93 |
| 4,275,869 | 6/1981 | Clements | 254/93 HP X |
| 4,323,141 | 4/1982 | Ragan et al. | 254/93 HP X |
| 4,479,426 | 10/1984 | Olenfalk | 100/37 |
| 4,542,882 | 9/1985 | Choe | 254/93 HP |
| 4,560,145 | 12/1985 | Widmer | 254/93 |
| 4,596,506 | 6/1986 | Burgardt et al. | 414/426 |
| 4,597,584 | 7/1986 | Hanser | 280/6.183 |
| 4,605,203 | 8/1986 | Hooper et al. | 254/93 HP |
| 4,629,162 | 12/1986 | Porche | 254/93 |

(List continued on next page.)

FOREIGN PATENT DOCUMENTS

| | | | |
|---|---|---|---|
| 2305381 | 10/1976 | France | 254/93 HP |

*Primary Examiner*—Paul N. Dickson
*Assistant Examiner*—Brian Fischmann
*Attorney, Agent, or Firm*—Santangelo Law Offices, P.C.

[57] ABSTRACT

A leveling system for leveling a recreational vehicle. A tire engaging, inflatable container can be utilized to provide a support surface under a tire of the vehicle. Then, the tire engaging, inflatable container can be at least partially inflated to establish the vehicle in a level position. The tire engaging, inflatable container can present a low profile configuration that allows a tire to be rolled on easily. In this manner, the tire engaging inflatable container is not pushed out of position by the tire. Through the use of a flexible, yet non-stretchable or non-elastic material, the tire engaging, inflatable container limits any bounciness which might normally be encountered when the vehicle is in a level position. A large surface area on the tire engaging, inflatable container permits a tire to be easily positioned on the surface without being concerned about exact positioning. Similarly, a large surface area permits more than one tire to be used to establish the vehicle in a level position. Finally, a light reflection system can be used to prevent heat gain which might result in an unwanted change in the amount of inflation of the system.

36 Claims, 6 Drawing Sheets

U.S. PATENT DOCUMENTS

| | | | |
|---|---|---|---|
| 4,641,843 | 2/1987 | Morrisroe et al. | 280/6.183 |
| 4,643,408 | 2/1987 | Stoll | 269/22 |
| 4,687,189 | 8/1987 | Stoll et al. | 269/22 |
| 4,733,876 | 3/1988 | Heider et al. | 280/6.153 |
| 4,743,037 | 5/1988 | Hanser | 208/6 R |
| 4,783,089 | 11/1988 | Hamilton et al. | 280/6.153 |
| 4,784,400 | 11/1988 | Hofius | 280/6.153 |
| 4,938,305 | 7/1990 | Park | 254/93 HP X |
| 4,948,107 | 8/1990 | Orndorff, Jr. | 254/93 |
| 4,961,564 | 10/1990 | Schult et al. . | |
| 4,982,465 | 1/1991 | Nagata et al. | 5/450 |
| 4,993,685 | 2/1991 | Sparling | 254/88 |
| 5,118,081 | 6/1992 | Edelman | 254/88 |
| 5,176,391 | 1/1993 | Schneider et al. | 280/6.153 |
| 5,203,850 | 4/1993 | Harrold . | |
| 5,306,031 | 4/1994 | Quinn et al. | 280/688 |
| 5,312,119 | 5/1994 | Schneider et al. | 280/6.153 |
| 5,313,679 | 5/1994 | Yamaguchi | 254/93 HP X |
| 5,414,886 | 5/1995 | Sust et al. | 254/93 HP X |
| 5,441,237 | 8/1995 | Sweeney | 254/93 HP X |
| 5,492,300 | 2/1996 | Riihiluoma et al. | 254/93 HP X |
| 5,722,641 | 3/1998 | Martin et al. . | |

METHOD OF LEVELING A RECREATIONAL VEHICLE

This application is a continuation of application Ser. No. 08/761,969 filed Dec. 10, 1996, and thereby also claims the benefit of application Ser. No. 60/008,456 filed Dec. 11, 1995.

BACKGROUND OF THE INVENTION

This invention relates generally to the field of leveling recreational vehicles (RV's) such as camp trailers, motor homes, etc. Specifically, it involves the field of fluid actuated leveling devices that act upon the wheels of an RV to achieve a desired, usually level configuration. The invention is designed to improve and simplify the leveling procedure for RV's.

Existing systems for leveling RV's usually require that the wheels be raised or lowered to a set, level position. These methods include parking the wheels on top of wood blocks, rocks, sticks, mechanical ramps, pneumatic ramps, and plastic and rubber blocks. The wheel(s) often need to be in an exact position. This may be on top of the item or at the right position on a ramp or in a hole for a proper configuration. This aspect of specifically configuring an RV to a usually level orientation distinguishes the field of the present invention from fields such as those involving emergency applications and those presenting devices designed for maintenance or repair and other such precisely defined actions. In the emergency device field, products are designed to be used infrequently and for a focused event (i.e., to change a tire). They do not need to withstand the elements or be as durable as designs for the present field. Further, the tire cannot be used for support or it could not be removed. In the maintenance or repair field, a precise and often repetitive event is achieved under fairly controlled circumstances. Further, the person accomplishing the event is usually well trained for the specific task. Unlike each of these, devices in the field of the present invention must be designed quite differently to adapt to persons with widely varying skills and capabilities and to achieve their purposes under not only varying circumstances but also under instances where the limits of the device may not be fully appreciated. Inventions in this field need to be designed to be used by one person who may also drive the vehicle.

In use, RV's usually need to be close to level for normal living conditions. For sleeping, it can be important not to have your feet higher than your head. Cooking can be a problem if the cooking oil or liquid goes to one side of the pan. In addition, some RV refrigerators may not work if not fairly level.

Leveling with wood blocks, rocks, sticks, ramps, plastic blocks and rubber blocks, often require the wheels to be going up an incline and then to be stopped in an exact position. These leveling devices are all susceptible to moving when the wheel starts up on them. If the blocks, or other device moves, this can mean starting the leveling procedure all over again. Similarly, if the vehicle wheels go too far, it may be necessary to start the leveling procedure over again.

Leveling with wood blocks usually requires having a number of blocks for different amounts of adjustment as may be needed to level the vehicle at different campsites. Blocks can be difficult to park on especially if the vehicle is tandem wheeled. Often people carry short blocks for easier storage as well a large variety of sizes and thicknesses for different requirements. The short blocks have a tendency to slip or fall when moving vehicle tires upon them. Not having the right quantity of blocks under the wheels to make it level when the vehicle is parked on the blocks is quite common—and frustrating. Wood blocks break, get cut up for firewood or used for other purposes at home and must be replaced. When using wood blocks, the vehicle is normally going up an incline and then must be stopped while the wheels are on top of the blocks. This is easier said than done, because once on top of the blocks, the vehicle tires roll easily, making it difficult to stop before rolling off the short blocks.

Leveling with sticks and rocks is very difficult, because normally the correct size stick or rock cannot be found. It is even more difficult to get the vehicle tires on the rocks or sticks, since they are more apt to move or fall. It is almost guaranteed that it will take several tries and still not be level . . . frustrating to say the least.

Leveling with plastic blocks can also require having a number of blocks. The user may have to move off of the blocks and reset their height to be level. The blocks may also move when trying to park on them. For leveling, the vehicle may be going up an incline and have to be stopped right on top. As mentioned earlier, this is easier said than done.

Leveling with a tapered ramp can require that the vehicle be moved up an incline and then stopped at the exactly correct position. Usually, the vehicle must not be allowed to move from this position if it is to be kept level. This procedure is difficult to do. The ramp may want to tip or move when the wheel starts up the incline. If the vehicle is a trailer, it can be even more difficult to keep in position and block. If the vehicle goes too far and goes over the end of the ramp it could cause damage to the vehicle by tipping the front of the ramp up and catching the bottom of the vehicle and the wheel at the same time. As in many of the existing systems, this is fairly typical—seemingly simple systems actually are difficult to implement and can also have extremely undesirable failure modes. Many do not have good failsafe designs.

Leveling a recreational vehicle through a pneumatic ramp has been known. In U.S. Pat. No. 3,990,681, this is disclosed through the presentation of a device which is essentially an inflatable ramp. The device is inflated and then driven up on. It may then be lowered to achieve the configuration desired. As with any ramp-based system, this device requires skill and coordination to achieve proper positioning. Further, the top of the ramp is disclosed to be fairly rigid. As mentioned earlier, the rigid ramp-based design actually increases the challenge of proper positioning. As disclosed, the ramp is to be inflated before using. The disclosure suggests that this be accomplished at a service station and that the ramp should be hauled inflated. Obviously this is bulky and takes up enormous space. If the inflatable ramp were designed for a tandem wheel vehicle, it would have to be approximately 8 ft or longer when stored. In addition, if too much air is let out of the ramp, the vehicle would need to be moved off the ramp; the ramp would need to be reinflated likely offsite, and the vehicle would then be re-driven back up the ramp, hoping to let the correct amount of air out this time. Such inconveniences are undesirable. As to storage, even when all the air is out of the ramp, there still appears to be a long hard-surface item to handle and store.

Thus, existing systems for leveling a RV are not adequate in several regards. Blocks and the like are not capable of the type of infinite adjustment a pneumatic or hydraulic system can achieve. Ramps require going up an incline or stopping on an incline. This must be avoided if the system is to be easily implemented. For the same reason even the existing pneumatic ramp-based systems are inadequate as stopping at a fairly exact position is too challenging. Further, systems should not be moving or flexing when trying to park the vehicle. The appropriate system should not only be cost-effective, it should not require considerable effort, and should not need two people to efficiently implement. It should not be a source of frustration on one's vacation.

The present invention overcomes all of these limitations. It does not move when driven on, and only requires the vehicle tire to approximately be positioned. Like parking on a piece of carpet, it is easy to use. If the vehicle wheels go too far, all that is required, is to move the vehicle wheel back by backing up into the right position. It is not necessary to start the complete procedure all over, as with blocks or ramps (pneumatic or not). You do not have to haul additional elements that may or may not be needed.

The invention will not be used for fire wood and will not break after a few uses. It will not soak up water and then crack and split. It will not sink in mud, and can easily be washed off or cleaned. The invention is a one piece assembly and is infinitely adjustable for leveling any RV design.

By presenting a system which can be achieved through both apparatus and methods, the invention goes beyond the teachings of those who have sought to achieve simple leveling of an RV. This may be surprising, however, it should be understood that although there was a long felt need to have a simple and inexpensive separate system to level an RV, this need remained largely unsatisfied even though the materials and implementing arts had long been available. Perhaps this was due to the fact that although those skilled in this field appreciated that a problem existed, they may not have fully appreciated that the nature of the problem was a proper understanding of the challenges of each step in use. In essence, they simply may have failed to understand the true nature of the problem and so failed to achieve the appropriate solution as evidenced in part by the pneumatic ramp invention. This is perhaps highlighted by the fact that in spite of the fact that there have been substantial attempts by those skilled in the art to fill the need, these attempts may have failed because of the limits to understanding. Instead, as the previous approaches demonstrate, there was a teaching away from the technical direction of the present invention by those skilled in the art. It might even be true that to some degree the results of the present invention might be characterized as unexpected in that it elegantly overcomes problems that have been present for years and in that it does this using elements that have been available for years.

SUMMARY OF THE INVENTION

Accordingly, the invention presents a tire engaging, inflatable container, such as a reinforced, flexible, airtight membrane. This membrane is designed to be placed in a substantially uninflated state, driven upon while it presents a low profile surface, and then inflated in such a manner as to surround the wheel for stability and load distribution. Unlike even the unrelated emergency devices, this design is completely flat so that it may be driven upon like a piece of carpet. Challenges in precise positioning of either the device or the vehicle are avoided. After the vehicle tires are sitting on the flexible, airtight membrane, the system may be inflated with a pump connected to an inflation element. The pump may be (but is not limited to) a 12-volt device so it may be plugged into the 12 volt outlet of a vehicle. When the vehicle is level, the pump can be turned off and can be disconnected from the flexible, airtight membrane and the 12 volt power. When getting ready to move to the next campsite, a special deflation element can be opened and the flexible, airtight membrane can be deflated. The flexible, airtight membrane may be unitary and totally enclosed. Safety, inflation, and deflation elements may be molded in separately or as part of a manifold element. The manifold can be left attached to the flexible, airtight membrane at all times and may consist of a drain mechanism (e.g., a deflation passage), an over pressure release or popoff mechanism to serve as a safety release, and an inlet port (e.g., an inflation passage for permitting the flow of fluid to the tire engaging inflatable container). The flexible, airtight membrane may also have a vulcanized handle for making it easier to transport. The reinforcing in the flexible, airtight membrane is similar to that of a tire; it may be a poly, Kevlar or other similar material. While the systems may be elastic, it is currently believed that an inelastic element is preferable for enhanced stability.

Naturally an object of the invention is to achieve stable leveling of an RV vehicle. Thus a goal is to provide a system which is relatively bounce-free after the leveling event occurs. Interestingly, a goal is to present a firm surface when positioning the vehicle and then a movable surface to achieve leveling. Once level a goal is to make that surface as stable (e.g., free from bounciness) and as secure as necessary.

It is also an object of the invention to provide a system which does not require precision in its use. It is a goal to have a system for which no unusual skills are required and for which coordinated efforts from different locations are not critical. In keeping with this object, it is also a goal to have a system which is separately adjustable from a location other than the location occupied while positioning the vehicle.

Another general object of the invention is to provide a system which is practical to use at times apart from the actual leveling event. A goal is thus to have a system which stores in a compact area and which is durable. A similar goal is to use materials which cannot only withstand the inevitable wear of being placed upon a ground or earthen surface, but also one which can withstand ultraviolet impacts as well as blatant abuses (such as children might create) to the extent practical. In keeping with the object of facilitating use, it is a goal to present a device which can be easily cleaned as well as one which does not require many individual parts for the user.

A further general object of the invention is to provide a system which is economical to manufacture. A goal is thus to have a system not only with limited parts but also which uses components which are each economical. It is also a goal to provide a system which uses a low pressure pump among other specific, readily available components.

DESCRIPTION OF THE PREFERRED EMBODIMENTS.

As can be easily understood, the basic concepts of the present invention may be embodied in a variety of ways. It involves both the processes of leveling an RV vehicle as well as devices to accomplish the appropriate process. In this application, the processes are disclosed as part of the results shown to be achieved by the various devices described and as steps which are inherent to utilization (e.g., positioning on top of the device, etc.). They are shown as simply the result of utilizing the device as intended and described. In addition, while some devices are disclosed, it should be understood that these not only accomplish certain methods but also can be varied in a number of ways. Importantly, as to all of the foregoing, all of these facets should be understood to be encompassed by this disclosure.

Figure 1:
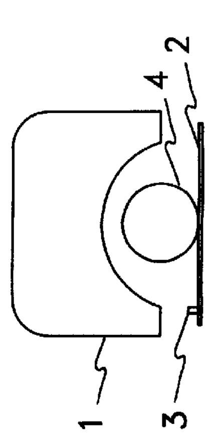
FIG. 1 shows a side view of an RV vehicle on a substantially uninflated, flexible, airtight membrane.

Basically the preferred embodiments are shown beginning with FIG. 1. These systems are designed to fill the need to have a simple, inexpensive, easy-to-use item for leveling recreational vehicles. One person can park on and level the vehicle easily with minimum effort.

As shown in FIG. 14, the system includes a tire engaging, inflatable container, such as a flexible, airtight membrane (2), which may be positioned in a substantially uninflated condition on a surface, typically a ground surface. The recreational vehicle may then be driven over (e.g., pulled or backed over) the top of the flexible, airtight membrane (2) so that one of the vehicle tires is positioned over at least a portion of the tire engaging, inflatable container. (This can also be viewed from the perspective that the tire engaging inflatable container is positioned or established under at least one tire of the recreational vehicle (1).) The tire engaging, inflatable container may then be at least partially inflated by some type of device such as a pump (14). As the tire engaging, inflatable container is inflated, the recreational vehicle (1) is lifted and can be established in a leveled support position. In such a support position, the tire engaging, inflatable container supports at least a portion of the weight of the vehicle. FIGS. 1 through 4 show this process as well.

It should be understood that for the purposes of this patent the phrase "substantially uninflated condition" is intended to encompass a condition in which the tire engaging, inflatable container has expelled the fluid which is used to fill it to the degree possible under normal operating conditions. For example, if the tire engaging inflatable container is filled with air (air and other gases are fluids), the tire engaging inflatable container is in a substantially uninflated condition when a valve which might be used to seal the tire engaging, inflatable container is opened and air is allowed to escape to the atmosphere to the natural extent possible under the given atmospheric conditions.

Figure 2:
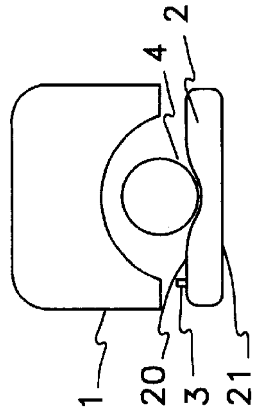
FIG. 2 shows a side view of that RV vehicle on a partially inflated, flexible, airtight membrane.
Figure 3:
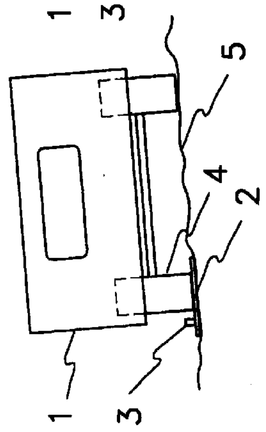
FIG. 3 shows a rear view of the RV vehicle on unlevel ground with its lower side tire sitting on a substantially uninflated, flexible, airtight membrane.
Figure 4:
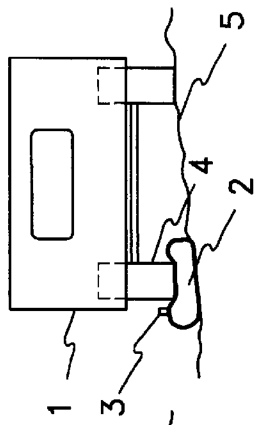
FIG. 4 shows a rear view of the RV vehicle on unlevel ground with it's lower side tire on a partially inflated flexible, airtight membrane.

In FIG. 1 it can be seen that the recreational vehicle (1) has one or more of its vehicle tires (4) positioned on top of a tire engaging inflatable container, such as a flexible, airtight membrane (2). As the flexible, airtight membrane is inflated, the flexible, airtight membrane (2) acts to conform to and to lift the vehicle tire (4) as shown in FIG. 2. This can bring about leveling as shown in FIGS. 3 and 4 whereby the recreational vehicle (1) even though positioned on unlevel ground (5) can be leveled through this system.

The tire engaging, inflatable container, such as the flexible, airtight membrane (2) shown in FIG. 2 may comprise a tire engagement surface (20). This tire engagement surface (20) can be utilized for engaging at least a portion of one tire of the vehicle. The tire engagement surface can be adapted to exert a force against at least one side of the tire to limit the movement of the tire and vehicle once a level position is established. (A side of the tire should be understood to encompass not only the sidewalls, but also the bottom or ground engaging surface or tread, and the tread immediately in front of and immediately in back of the ground engaging surface.) When more than one tire is engaged by the tire engagement surface, this tire engagement surface serves as a multiple tire engagement surface. Also, the tire engaging, inflatable container comprises a support engagement surface for engaging a support surface (typically the ground).

Uses of such systems are easily understood. Simply park the vehicle in the position wanted. Then it may be possible to lay the flexible, airtight membrane (2) beside the tires such as on the low side of the recreational vehicle (1). Move the vehicle far enough either forward or back, whichever is more convenient, then slide the flexible, airtight membrane (2) where the wheels were previously positioned. Then, move the vehicle (1) back to the prior position by driving onto the flexible, airtight membrane. One person can do this easily. Note, it is not necessary to move the vehicle a great distance to get on the flexible, airtight membrane (2), just roughly the length of the flexible, airtight membrane (2).

One significant advantage of this type of leveling system is that there is no need to be precise in positioning either the vehicle or the tire engaging inflatable container. Rather, a large surface area is used for the tire engaging inflatable container to provide multiple locations for supporting at least one of the vehicle's tires. All that is required is that the vehicle be driven onto and stopped on any portion of the substantially uninflated, tire engaging, inflatable container. In this manner, a preinflation position is determined during the process of driving onto the tire engaging, inflatable container. The tire engaging, inflatable container then adapts to conform to the tire and to establish a stable support as the tire engaging inflatable container is inflated. This aspect of only having to drive onto the tire engaging inflatable container is a significant advantage over prior systems, such as that disclosed in U.S. Pat. No. 3,990,681. In that system, the vehicle had to be driven all the way to the end of the ramp in order to get the ramp to level out. In my invention, however, the driver of the vehicle does not have to drive to the end of the ramp and therefore does not have to worry about driving off the end of a ramp and causing damage to the vehicle. Rather, the driver may simply drive the vehicle onto the uninflated surface and then inflate—safely.

As can be seen in FIG. 14(*d*), the tire engaging inflatable container can be sized to accommodate more than one tire. This too is a significant advantage over prior systems. Nobody in the past seems to have appreciated the fact that a vehicle could be leveled by inflating from under more than one tire of the vehicle simultaneously. One aspect of my invention, however, allows a user to position a tire engaging, inflatable container under at least two tires of the vehicle to engage those tires and then be inflated to establish and support the vehicle in a level position. The tire engaging inflatable container applies an upward force at more than one of the tires to accomplish this leveling. As shown in FIG. 14(*d*), a tandem arrangement of tires can be supported; however, other arrangements of tires could be lifted as well. For example, with some types of vehicles, it might be desired to support a dual tire arrangement, which is often referred to as a "dually" (i.e., two tires positioned side by side so that they could be used on the same axle of the vehicle). Large trucks and some RV's have dual tire arrangements.

As noted above, a desired feature is that the tire engaging inflatable container be large enough to accomplish its desired objectives. Therefore, as used in this patent, the word "large" when used to describe the surface area of the tire engaging inflatable container or tire engagement surface is intended to encompass a surface area large enough to support at least two tires or to permit multiple, non-overlapping support positions such that a tire could be supported in more than one independent location.

The flexible, airtight membrane (2) may preferably be made durable and yet flexible enough that it permits the flexible, airtight membrane to be easily rolled or folded into a compact arrangement or left flat for storing. Being flexible lets it conform to the surface that it is placed on, this may eliminate any movement of the flexible, airtight membrane (2) when the vehicle wheels move on it, making it much safer. While it could be elastic, it is generally preferred that the flexible, airtight membrane not be elastic. In this manner, the system helps prevent the RV from bouncing when in its leveled position. This is a feature that others have apparently failed to appreciate.

Parking on the flexible, airtight membrane (2) can be like parking on a piece of carpet. Since it is flat against the ground at this point in time, there is no change of incline to the parking surface. Unlike a stack of blocks the wheels cannot fall off of the system when positioning them. This minimizes hazards to bystanders and the vehicle which might exist in previous systems. Due to its flatness, the membrane is adapted to present a short leading edge (e.g., about one inch in height) for engagement by the tire as the tire is driven onto it. This is very significant, because the short leading edge allows the tire to roll easily onto the membrane and prevents the membrane from being pushed ahead of the tire or out of position. That is a serious disadvantage of any devices that are preinflated before being engaged with the tire—they move easily. The membrane can also be prevented from moving out of position due to its large surface area that establishes firm engagement with the support surface (typically a ground surface).

The system can be used on any normal surface that you would drive on, rocks etc. While it should not be placed on broken glass or nails, if the flexible, airtight membrane (2) does develop a leak, it may be designed so that it can be patched just like a tire.

Once the vehicle (1) is positioned, if it has not already been connected, the pump (14) may be connected to the inflation element (7) of the flexible, airtight membrane (2). This may be accomplished in the same manner as connecting to a tire to be inflated. The 12 volt electric cord from the pump (14) could then be plugged into a vehicle's 12 volt receptacle such as a cigarette lighter. The pump may then be operated to inflate the flexible, airtight membrane to level the recreational vehicle (1). When the vehicle (1) is level, simply turn off the pump (14), and disconnect it from the inflation element (7) of the flexible, airtight membrane (2) and unplug from the 12 volt supply. This may even be accomplished remotely via a remote controller, such as from inside the vehicle, while monitoring a level or the like. For purposes of this patent, the meaning of the word "remote" is intended to encompass positions not in the immediate vicinity of the tire engaging inflatable container as well as when the user is within any vehicle or other structure. The RV (1) is now level and ready to be occupied. For a trailer the electric cord would usually be plugged into the towing vehicle's 12 volt system. The pump (14) should be supplied with a cord that is long enough to reach the outlet when the vehicle is connected to the trailer.

A variety of failsafe mechanisms for the inflation step can be included. A level sensor which senses a level condition can be used to shut off the pump (14) (or to signal a fluid provider to turn off when a level position is achieved). Alternatively or in addition, the pump (14) may include a pressure sensor which limits the maximum amount of pressure it will output in order to control the amount of fluid delivered to the tire engaging inflatable container. Finally, the system may also include a release valve which prevents the pressure inside the flexible, airtight membrane (2) from exceeding a predetermined amount. The currently preferred embodiment incorporates these last two mechanisms, namely, a pressure limit as part of the pump (14) as well as a safety element (8).

As shown in the Figures, the flexible, airtight membrane (2) may conform to the tire (4) when pressurized, thus partially wrapping around the tire (4). This may help distribute the load and may enhance stability. The flexible, airtight membrane (2) may also have very minimal stretch to increase stability of the vehicle. The tire (4) can thus be held in a partial wrapped position, both sideways and lengthwise. Or, the flexible, airtight membrane may be adapted to automatically adjust to the tire to provide support to all sides of the tire. This can help prevent the tire (4) from slipping or rolling and can increase safety. The partial wrapping or conforming of the flexible, airtight membrane results in a force being exerted against the tire to limit movement of the tire and consequent movement of the vehicle from the level position. Namely a force is exerted against the sides and bottom of the tire which are engaged by the flexible, airtight membrane. Depending on the physical characteristics of the flexible, airtight container, a force could be exerted against: a single side of the tire, both sidewalls of the tire, the front side of the tire, the back side of the tire, or in the preferred embodiment all sides of the tire that border the bottom surface of the tire engaged with the flexible, airtight membrane. The flexible, airtight membrane (2) being flexible and conforming to the tire (4) presents a larger area for lifting, which may mean that it may require a lower pressure in the flexible, airtight membrane (2) to level the vehicle (1).

Unlike the systems suggested in the prior art, the flexible, airtight membrane (2) may be reinforced and made of a material which has minimal stretch. This may increase its stability and reliability. Basically, the present invention recognizes that once level, it is desirable for the recreational vehicle (1) to move as little as possible. While the medium used for inflation (e.g., air) may be compressible, it is desirable to minimize this effect. By using a non-elastic membrane (2), the effects of compressibility may be minimized. Further even non-compressible fluids (e.g., water) could be used for some applications.

Regardless, the flexible, airtight membrane (2) may be made of a rubber compound or some other material, including, but not limited to an elastic rubber. It may also be reinforced with poly-type material, Kevlar, or other commonly used reinforcement materials. The flexible, airtight membrane (2) may be totally enclosed and vulcanized with a fitting in it for installing a manifold (3). This flexible, airtight membrane (2) may be made very durable and should last many years under normal use.

Figure 10:
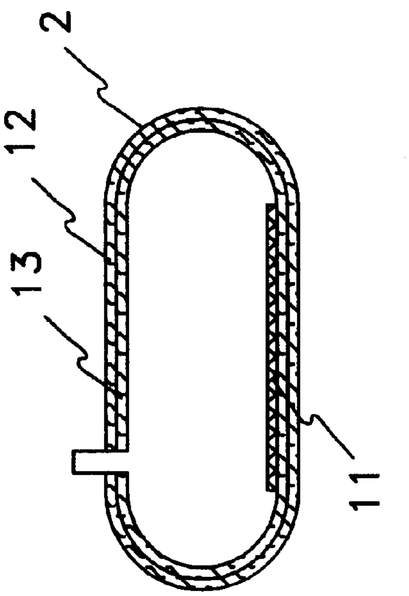
FIG. 10 shows a cutaway view of an inflated flexible, airtight membrane.

As mentioned, the flexible, airtight membrane (2) may be vulcanized or even totally enclosed. In such construction techniques there are likely no clamping plates that might leak, no glue joints which may take time to manufacture, and fewer areas prone to failure. The reinforcing layers of material may be overlapped at the corners and the seams for added strength before vulcanizing. This can eliminate the need to add extra material or use special clamps such as metal corners. As shown in FIG. 10, in vulcanizing or surrounding the membrane, there may be an extra layer (11) of vulcanized material on the bottom surface to enhance durability against the potentially rough surfaces of the ground (5) that may be encountered. The top may similarly be reinforced. Similarly, there may be a layer (12) of reinforced material with cords or strands going in the longitudinal direction, to enhance integrity on all or just the top surface. Finally, there may be a layer of reinforced material with cords or strands going in a different direction (13) than the ones in an adjacent layer (12). These may be angled up to ninety degrees with respect to the adjacent layer. Each of these designs can enhance the durability and integrity of the product. They allow the device to achieve one of its desired objectives: to provide structural support capable of maintaining a vehicle in a constant level support position for a prolonged period of time. Note that this is significantly different from products which are only designed to support a vehicle in an unlevel position for a brief period of time. My invention is designed to provide support for a prolonged period of time (e.g., two days or longer).

Figure 5:
FIG. 5 shows a top view of the flexible, airtight membrane.
Figure 6:
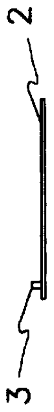
FIG. 6 shows a side view of a substantially uninflated flexible, airtight membrane.
Figure 7:
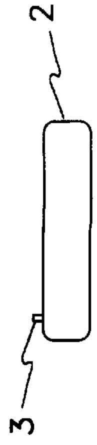
FIG. 7 shows a side view of a partially inflated, flexible, airtight membrane.

As shown in FIGS. 5, 6 and 7, the flexible, airtight membrane (2) may have integral to it some type of manifold (3). This manifold may be a location at which all air passages are controlled. This may include the passage of air to inflate, the passage of air to deflate, and the passage of air to serve as a safety release. By designing in an attachment which is vulcanized integral to the membrane, a manifold (3) can be securely attached to the flexible, airtight membrane (2).

Figure 8:
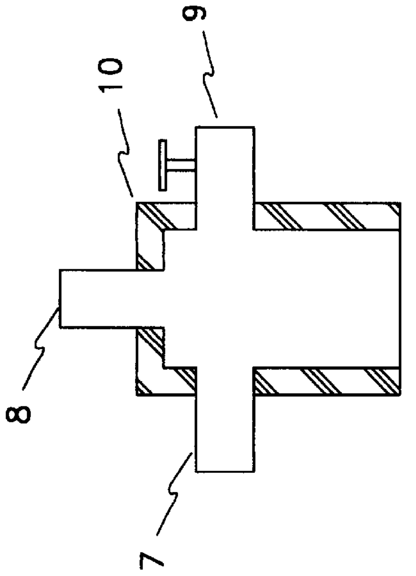
FIG. 8 shows a view of one manifold assembly with a safety element externally positioned.
Figure 9:
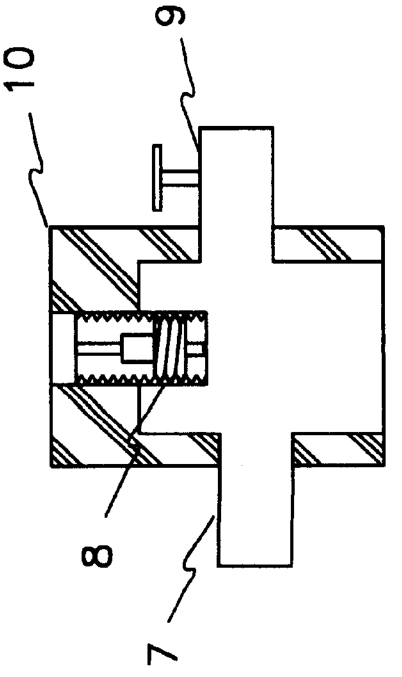
FIG. 9 shows a view of another manifold assembly with a safety element internally positioned.

As shown in FIGS. 8 and 9, the manifold (3) may consist of a housing (10), a deflation element (9), a safety element (8), and an inflation element (7). The manifold housing (10) may even be simply a method of holding the other parts. The deflation element (9) may be any type of mechanism for letting out the medium, usually air (a liquid, such as water could also be used), from the flexible, airtight membrane (2). This would allow the flexible, airtight membrane (2) to deflate. The deflation element (9) may be closed in normal use, and only be opened to deflate. In the preferred embodiment, this deflation element (9) is generally some type of openable valve.

As mentioned, the manifold (3) may also include an inflation element (7). This inflation element (7) may simply be a standard inflation valve so that existing air compressor fittings and the like might be used. Naturally, it is also possible that unique designs might be used to coordinate appropriate pumping elements and the like. In the preferred embodiment, the inflation element (7) is designed as a standard tire valve stem and valve core mounted in the standard method, like on a car tire. This is for inflating the flexible, airtight membrane (2) through use of the pump (14).

The manifold (3) or the systems generally may also include some type of safety element (8). As shown this may be installed on the manifold (3). It may also be installed elsewhere (such as a failure location on the membrane (2)) or may even be omitted. As shown the safety element (8) is installed inside the manifold (3) to help prevent it from being tampered with. The safety element (8) is installed to prevent the flexible, airtight membrane (2) from being over pressured either by the pump (14), by expansion, or otherwise. In one embodiment, the safety element (8) is merely a standard tire valve stem and valve core mounted in the opposite direction as normal. The end of the fitting, where normally air is put in, is toward the inside of the flexible, airtight membrane (2) and the spring on a standard valve core serves as the pressure control regulator. This is shown in more detail in FIG. 9. It results in roughly a 24 psi safety release which is more than adequate for most uses. Other designs are also possible.

Figure 11A:
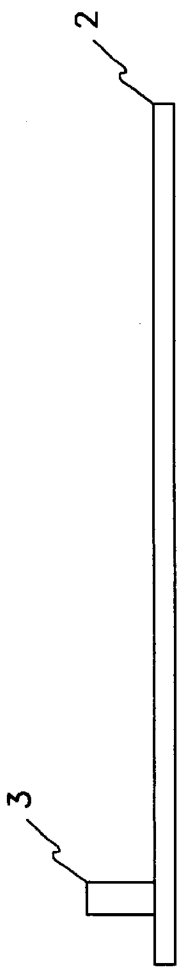
FIGS. 11*a*, 11*b* and 11*c* show a substantially uninflated, flexible, airtight membrane in a flattened position, being rolled into a compact configuration, and in a folded compact configuration, respectively.
Figure 11B:
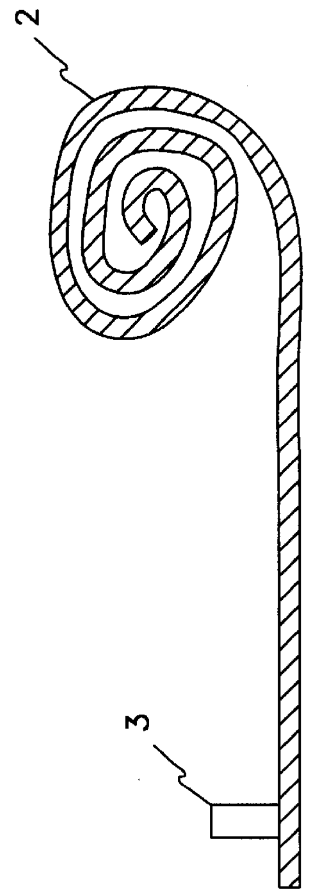
Figure 11C:
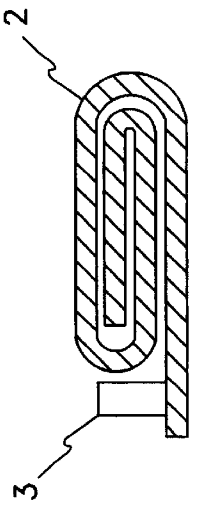
Figure 12C:
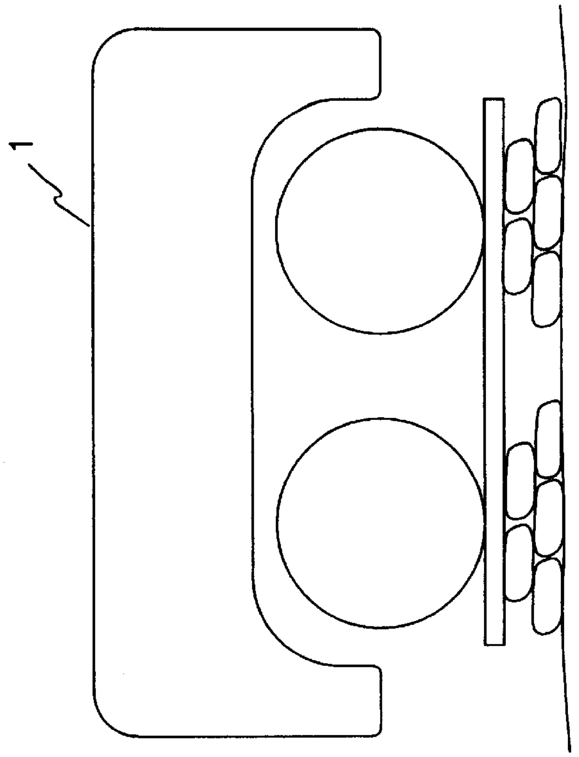
FIGS. 12*a*, 12*b* and 12*c* is a series of figures showing some prior art techniques and some of their limitations.
Figure 12A:
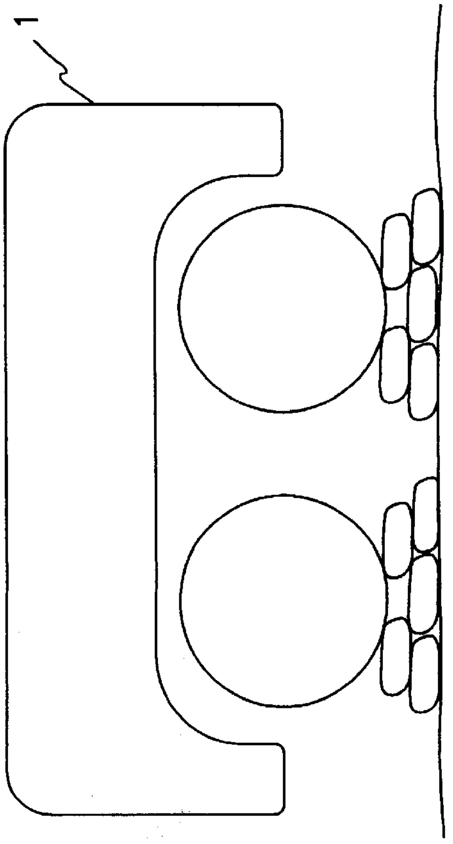
Figure 12B:
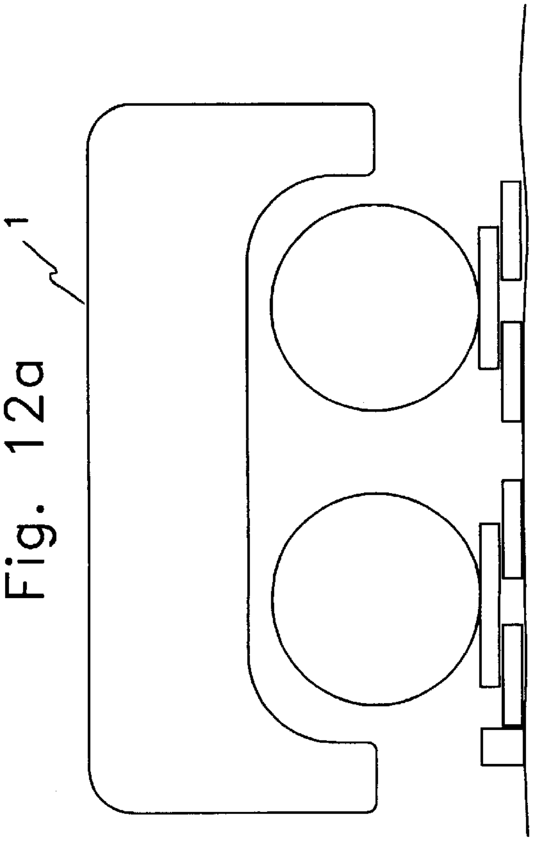
Figure 13:
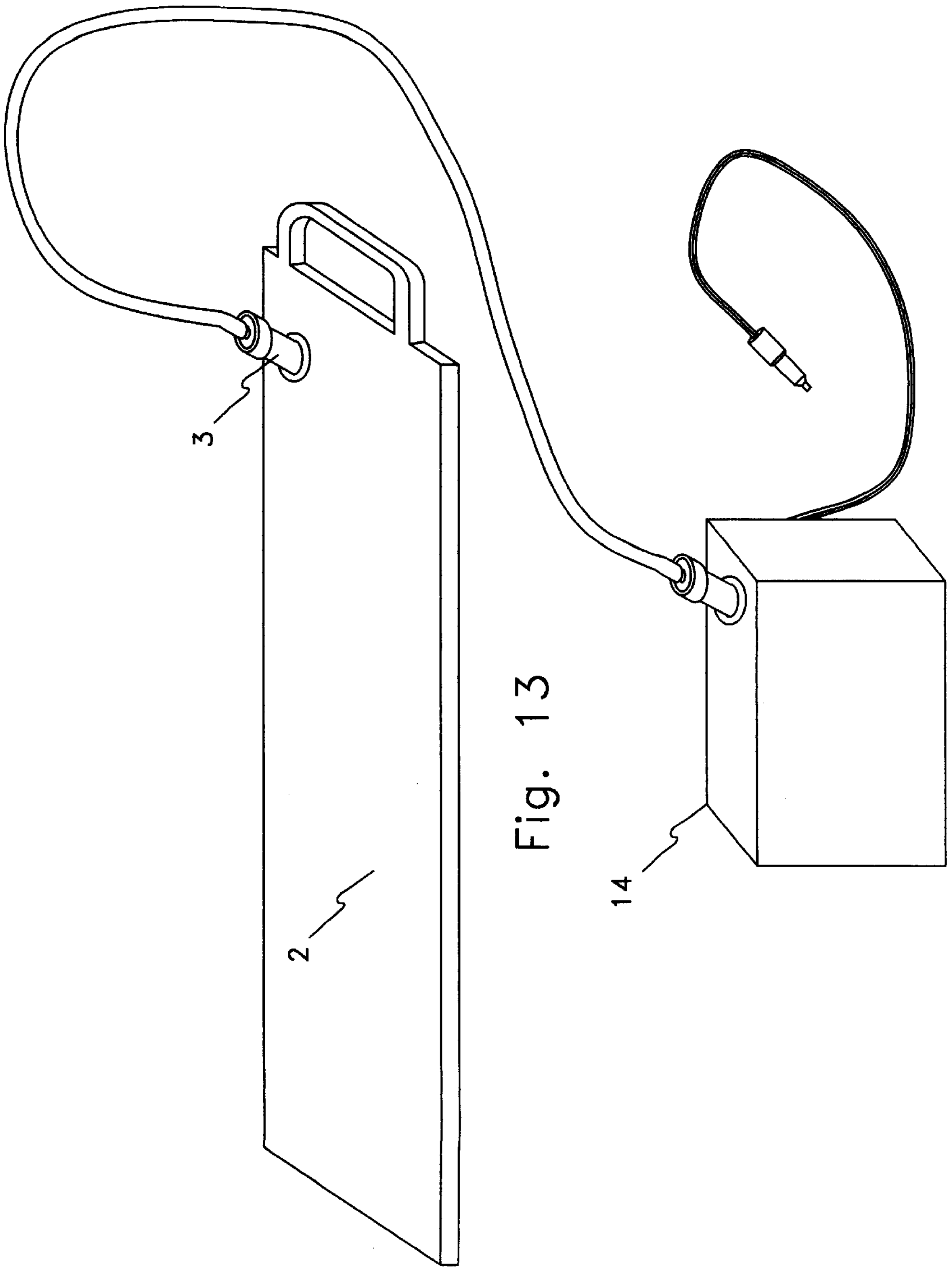
FIG. 13 is a figure showing a substantially uninflated system according to one embodiment of the present invention.
Figure 14C:
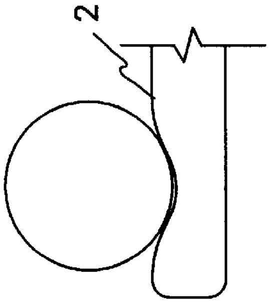
FIGS. 14*a*, 14*b*, 14*c*, and 14*d* is a series of figures showing steps in use of one embodiment of the invention.
Figure 14A:
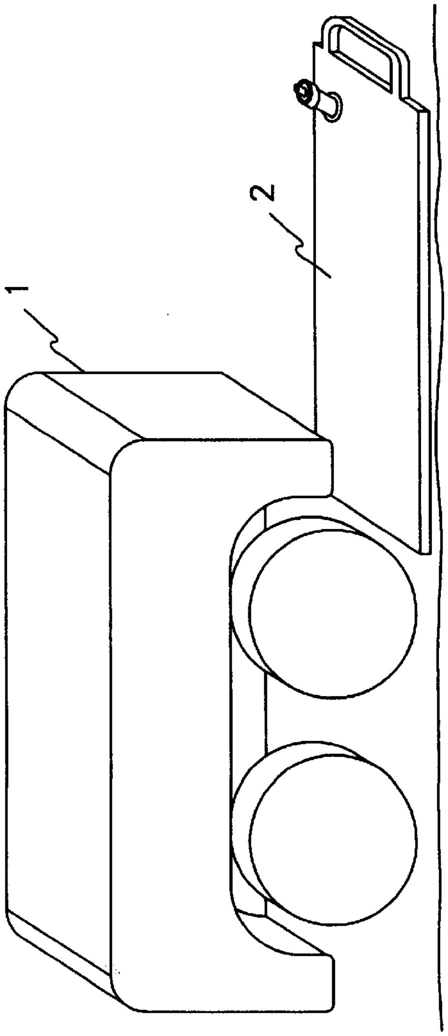
Figure 14D:
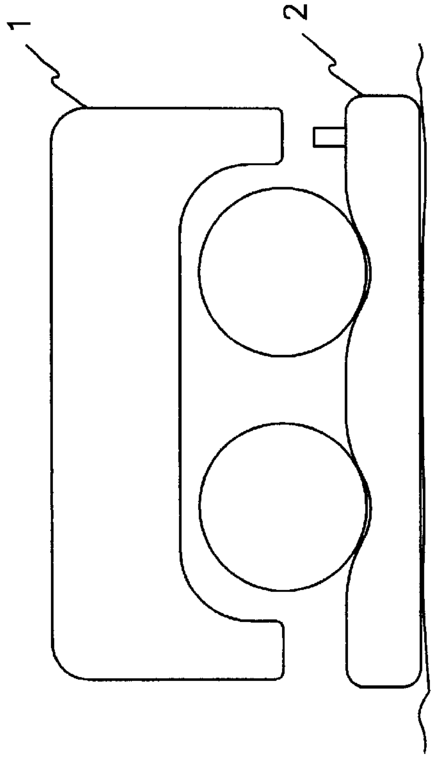
Figure 14B:
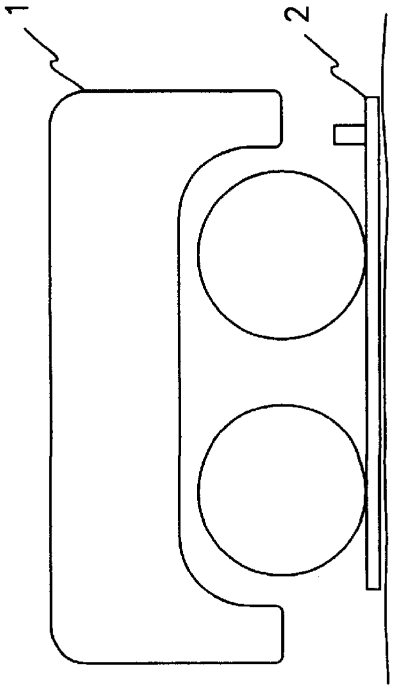

As shown in FIG. 5, the flexible, airtight membrane (2) may also have a handle (6) vulcanized to it for simplicity of transportation. If it is integral it will also likely save on manufacturing expense. As shown in FIG. 11, the systems can be deflated to a very flat or substantially uninflated condition and can then be rolled or folded for storing in a compact configuration.

In use, the flexible, airtight membrane (2) can be pressurized to lift the vehicle (1) to any height that is required to make the vehicle (1) level within the limits of the flexible, airtight membrane (2). Thus the flexible, airtight membrane (2) is adapted to provide infinite level adjustment of the vehicle by inflation.

As can be seen in the figures, the tire engaging inflatable container has been represented in a manner that reveals it to have a light coloring, namely white. This provides a way of reflecting incident light from the tire engaging inflatable container. This light coloring is a very significant feature; because, it prevents heat gain to the fluid housed by the tire engaging inflatable container when the tire engaging inflatable container is in a partially inflated condition. Any compressible fluid will be affected by this heat gain. For example, if air is used to fill the tire engaging inflatable container, the heat gain will result in an increase in the volume of the air and a change in the leveling of the vehicle. Therefore, to prevent the vehicle from being moved out of a level position due to such a heat gain, a white coloring or other light reflection technique may be utilized to reflect incident light from the inflatable container.

As mentioned earlier, the discussion included in this patent application is intended to serve as a basic description. The reader should be aware that the discussion may not explicitly describe all embodiments possible; many alternatives are implicit. It also may not explicitly explain the generic nature of the invention and may not explicitly show how each feature or element can actually be representative of a broader function or of a great variety of alternative or equivalent elements. Again, these are implicitly included in this disclosure. Where the invention is described in deviceoriented terminology, each element of the device implicitly performs a function and vice versa. Neither the description nor the terminology is intended to limit the scope of the claims.

Equivalent, broader, and more generic terms are implicit in the prior description of each element. Such terms can be substituted where desired to make explicit the implicitly broad coverage to which this invention is entitled. Further, it should be understood that a variety of changes may be made without departing from the essence of the invention. Such changes are also implicitly included in the description. They still fall within the scope of this invention.

What is claimed is:

1. A method of leveling a vehicle, said method comprising:

(a) providing an inflatable container for leveling a vehicle;

(b) positioning the inflatable container and the vehicle such that the inflatable container is between a support surface and a tire of the vehicle said tire directly engaging said inflatable container;

(c) at least partially inflating the inflatable container with a compressible fluid;

(d) establishing the vehicle in a leveled position;

(e) supporting the vehicle in the leveled position so as to allow an occupant of the vehicle to occupy the vehicle; and then (f) utilizing a light color on said inflatable container thereby reducing heat gain to the compressible fluid of the inflatable container so as to maintain the vehicle in position for a prolonged period of time.

2. The method of leveling a vehicle as described in claim 1 and further comprising:

raising the vehicle so as to establish the vehicle into the leveled position; and supporting a second tire of the vehicle with a ground support surface such that the second tire of the vehicle is in direct contact with the ground support surface when the vehicle is in the leveled position.

3. The method of leveling a vehicle as described in claim 1 wherein the inflatable container comprises substantially square comers and further comprising:

utilizing the inflatable container with substantially square comers so as to retain the inflatable container in a stable position.

4. The method of leveling a vehicle as described in claim 1 and further comprising:

configuring the inflatable container so as to resist movement from a stable, leveled position.

5. The method of leveling a vehicle as described in claim 1 and further comprising:

utilizing a flexible material for said inflatable container so as to allow said inflatable container to conform to a shape of said tire;

utilizing a substantially inelastic material for said inflatable container so as to reduce bounce produced by an occupant of the vehicle moving within the vehicle.

6. The method of leveling a vehicle as described in claim 1 and further comprising utilizing a flexible material about as inelastic as Kevlar.

7. The method of leveling a vehicle as described in claim 1 and further comprising:

maintaining the vehicle in the leveled position for a time period of two days.

8. A method of leveling a vehicle, said method comprising:

(a) providing a substantially uninflated tire engaging inflatable container for leveling a vehicle utilizing aflexible material for said inflatable container so as to allow said inflatable container to conform to a shape of said tire;

(b) establishing the substantially uninflated tire engaging inflatable container under a tire of the vehicle, said tire directly engaging said inflatable container; then (c) at least partially inflating said tire engaging inflatable container so as to raise the tire of the vehicle while other tires of the vehicle remain on a ground surface;

(d) conforming said tire engaging inflatable container to said tire;

(e) establishing the vehicle in a level position; and (f) maintaining the vehicle in the level position.

9. The method of claim 8 and further comprising supporting said vehicle in a level position for a prolonged period of time.

10. The method of claim 8 and further comprising adjusting to the tire to provide support to all sides of said tire.

11. The method of claim 8 wherein said establishing the vehicle in a level position comprises simultaneously applying an upward force at more than one tire of the vehicle.

12. A method of leveling a vehicle, said method comprising:

(a) positioning a tire engaging inflatable container under a tire of a vehicle utilizing a flexible material or said tire engaging inflatable container so as to allow said inflatable container to conform to a shape of said tire said tire directly engaging said inflatable container;

(b) at least partially inflating said tire engaging inflatable container;

(c) conforming said tire engaging inflatable container to said tire;

(d) establishing the vehicle in a level position by supporting the tire with the inflatable container while at least one other tire of the vehicle remains in contact with a ground surface; and (e) exerting a force against at least one side of said tire with said tire engaging inflatable container to limit movement of the vehicle from said level position.

13. The method of claim 12 wherein said exerting a force comprises exerting a force against a front side of said tire to keep said tire from rolling.

14. The method of claim 12 wherein said exerting a force comprises exerting a force against a back side of said tire to keep said tire from rolling.

15. The method of claim 12 wherein said exerting a force comprises exerting a force against at least one sidewall of said tire to keep said tire from moving.

16. The method of claim 12 wherein said tire has a bottom surface and wherein said exerting a force comprises engaging the entire bottom surface of said tire.

17. The method of claim 12 wherein said tire has a bottom surface and wherein said exerting a force comprises exerting a force against all sides of the tire that border the bottom surface of said tire.

18. The method of claim 12 wherein said exerting a force comprises utilizing a flexible membrane for said tire engaging inflatable container.

19. The method of claim 12 and further comprising applying a force with said tire engaging inflatable container against more than one tire to accomplish said establishing said vehicle in the level position.

20. A method of leveling a vehicle, said method comprising:

(a) positioning a tire engaging inflatable container beneath at least two tires of a vehicle utilizing a flexible material for said tire engaging inflatable container so as to allow said inflatable container to conform to a shape of said tire, said tires directly engaging said inflatable container;

(b) at least partially inflating said tire engaging inflatable container so as to lift said two tires while at least one other tire of the vehicle remains in contact with a ground surface;

(c) conforming said tire engaging inflatable container to said tire;

(d) establishing the vehicle in a level position; and (e) supporting the vehicle in said level position by exerting a force against said at least two tires with said tire engaging inflatable container while said at least one other tire of the vehicle is in direct contact with the ground surface.

21. The method as described in claim 20 wherein said supporting the vehicle comprises supporting a tandem tire arrangement.

22. The method as described in claim 20 wherein said supporting the vehicle comprises supporting a dual tire arrangement.

23. A method of leveling a vehicle, said method comprising:

(a) positioning a tire engaging inflatable container on a surface in a substantially uninflated condition utilizing a flexible material for said inflatable container so as to allow said inflatable container to conform to a shape of said tire;

(b) driving a vehicle onto at least a portion of said substantially uninflated tire engaging inflatable container so that at least one tire of the vehicle is positioned over at least said tire engaging inflatable container said tire directly engaging said inflatable container;

(c) at least partially inflating said tire engaging inflatable container;

(d) conforming said tire engaging inflatable container to said tire;

(e) establishing the vehicle in a level position with the tire engaging inflatable container; and (f) supporting the vehicle in a leveled position with the tire engaging inflatable container so as to allow the occupant of the vehicle to occupy the leveled vehicle.

24. The method of claim 23 and further comprising supporting the vehicle in said level position for a prolonged period of time.

25. The method of claim 23 and further comprising exerting a force against at least one side of said tire.

26. The method of claim wherein said tire has a bottom surface and further comprising exerting a force against all sides of said tire attached to said bottom surface.

27. The method of claim 23 wherein said driving onto at least a portion of said substantially uninflated tire engaging inflatable container comprises stopping on any portion of said substantially uninflated tire engaging inflatable container.

28. The method of claim 23 and further comprising determining a support position during driving onto said substantially uninflated tire engaging inflatable container.

29. The method of claim 23 and further comprising controlling said partial inflation from a remote location.

30. The method of claim 23 and further comprising:

deflating said tire engaging inflatable container to a substantially uninflated condition; then folding said substantially uninflated tire engaging inflatable container; and then storing said substantially uninflated tire engaging inflatable container in a compact configuration.

31. The method of claim 23 and further comprising establishing said substantially uninflated tire engaging inflatable container in firm engagement with said surface to resist movement of said tire engaging inflatable container during said driving onto said substantially uninflated tire engaging inflatable container.

32. The method of claim 23 and further comprising providing multiple locations on said tire engaging inflatable container for supporting said tire.

33. The method of claim 23 and further comprising engaging a plurality of tires simultaneously with said tire engaging inflatable container to establish the vehicle in said level position.

34. The method of claim 33 wherein said plurality of tires comprise a dual tire arrangement.

35. The method of claim 33 wherein said plurality of tires comprise a tandem tire arrangement.

36. A method of leveling a vehicle, said method comprising:

(a) providing a tire engaging inflatable container for leveling a vehicle;

(b) utilizing a flexible material for said tire engaging inflatable container so as to allow said tire engaging inflatable container to conform to a shape of a tire alter at least partial inflation of said tire engaging inflatable container;

(c) utilizing material about as inelastic as Kevlar for said inflatable container so as to reduce bounce produced by an occupant of the vehicle during movement by the occupant within the vehicle;

(d) providing a pressure sensor for said tire engaging inflatable container;

(e) providing a manifold for said tire engaging inflatable container;

(f) providing a discharge passage for said tire engaging inflatable container;

(g) positioning the tire engaging inflatable container on a ground surface in a substantially uninflated condition;

(h) configuring the tire engaging inflatable container to have substantially square corners so as to retain the tire engaging inflatable container in a stable position;

(i) driving the vehicle onto at least a portion of said substantially uninflated tire engaging inflatable container so that at least one tire of the vehicle is positioned over at least a portion of said tire engaging inflatable container;

(j) providing multiple locations on said tire engaging inflatable container for supporting said tire;

(k) determining a support position during driving onto said substantially uninflated tire engaging inflatable container;

(l) at least partially inflating said tire engaging inflatable container with a compressible fluid so as to raise said tire while at least one remaining tire of the vehicle remains in direct contact with the ground surface;

(m) conforming said tire engaging inflatable container to said tire;

(n) controlling said partial inflation from a remote location;

(o) engaging said tire with said tire engaging inflatable container;

(p) exerting a force against the front side of said tire to keep said tire from rolling;

(q) exerting a force against the back side of said tire to keep said tire from rolling;

(r) exerting a force against at least one sidewall of said tire to keep said tire from moving horizontally;

(s) establishing said vehicle in a level position with the tire engaging inflatable container;

(t) supporting the vehicle in a leveled position with the tire engaging inflatable container so as to allow the occupant of the vehicle to occupy the leveled vehicle;

(u) utilizing a light color on said inflatable container thereby reducing heat gain to the compressible fluid of the partially inflated tire engaging inflatable container so as to maintain the vehicle in position for a prolonged period of time; and (v) deflating said tire engaging inflatable container to a substantially uninflated condition so as to lower said vehicle.

* * * * *